(12) United States Patent
Liu et al.

(10) Patent No.: US 10,631,183 B2
(45) Date of Patent: *Apr. 21, 2020

(54) METHODS USED IN NETWORK NODE, AND RECEIVING AND TRANSMITTING NODES OF LINK, AND ASSOCIATED DEVICES

(71) Applicant: Telefonaktiebolaget L M Ericsson (publ), Stockholm (SE)

(72) Inventors: Jinhua Liu, Beijing (CN); Zhan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 40 days.

This patent is subject to a terminal disclaimer.

(21) Appl. No.: 15/535,605

(22) PCT Filed: Dec. 15, 2014

(86) PCT No.: PCT/CN2014/093829
§ 371 (c)(1),
(2) Date: Jun. 13, 2017

(87) PCT Pub. No.: WO2016/095084
PCT Pub. Date: Jun. 23, 2016

(65) Prior Publication Data
US 2017/0347281 A1  Nov. 30, 2017

(51) Int. Cl.
*H04W 24/08* (2009.01)
*H04L 5/00* (2006.01)
(Continued)

(52) U.S. Cl.
CPC ........... *H04W 24/08* (2013.01); *H04L 5/0048* (2013.01); *H04L 5/0091* (2013.01);
(Continued)

(58) Field of Classification Search
CPC ... H04W 24/08; H04W 24/10; H04W 72/082; H04L 5/0048
See application file for complete search history.

(56) References Cited

U.S. PATENT DOCUMENTS

2011/0258214 A1  10/2011  Shu
2013/0223268 A1*  8/2013  Jung ............... H04J 11/005
370/252
(Continued)

FOREIGN PATENT DOCUMENTS

| EP | 2566234 A1 | 3/2013 |
| WO | 2012068731 A1 | 5/2012 |
| WO | 2014124164 A1 | 8/2014 |

OTHER PUBLICATIONS

First Examination Report, Indian Application No. 201717017894, dated Feb. 11, 2020, 5 pages.

*Primary Examiner* — Rhonda L Murphy
(74) *Attorney, Agent, or Firm* — Sage Patent Group

(57) ABSTRACT

The present disclosure discloses a method used in a network node and an associated network node. The method includes: determining sounding and sensing related parameters for a link, wherein the determined sounding and sensing related parameters include dedicated sounding and sensing related parameters for the link and common sounding and sensing related parameters for all links controlled by the network node, and wherein the common sounding and sensing related parameters include a sounding and sensing period and a sounding and sensing interval; and transmitting the determined sounding and sensing related parameters to a transmitting node and a receiving node of the link. The present disclosure also discloses a method used in a receiving node of a link and an associated receiving node. The (Continued)

present disclosure further discloses a method used in a transmitting node of a link and an associated transmitting node.

18 Claims, 8 Drawing Sheets

(51) Int. Cl.
*H04L 27/00* (2006.01)
*H04W 24/02* (2009.01)
*H04W 24/10* (2009.01)
*H04W 72/08* (2009.01)

(52) U.S. Cl.
CPC ......... *H04L 27/0006* (2013.01); *H04W 24/02* (2013.01); *H04W 24/10* (2013.01); *H04W 72/085* (2013.01)

(56) References Cited

U.S. PATENT DOCUMENTS

| | | |
|---|---|---|
| 2014/0198766 A1* | 7/2014 | Siomina .............. H04W 72/082 370/330 |
| 2014/0328190 A1 | 11/2014 | Lord et al. |
| 2015/0264652 A1* | 9/2015 | Zhang ................. H04W 52/143 455/522 |
| 2016/0330643 A1* | 11/2016 | Sahin ................... H04W 16/14 |

* cited by examiner

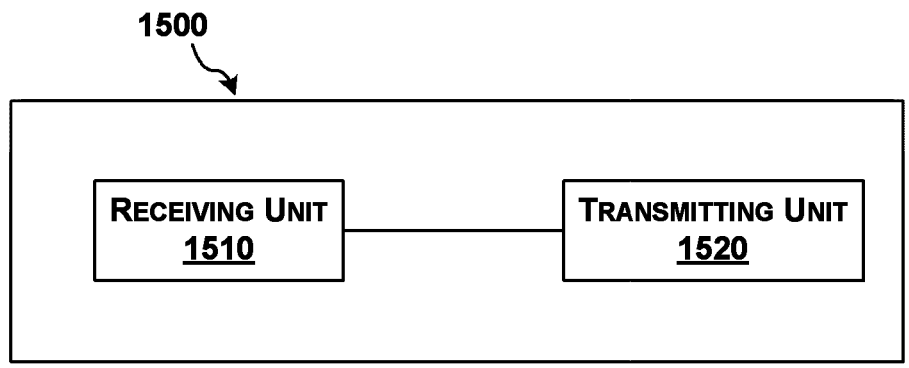
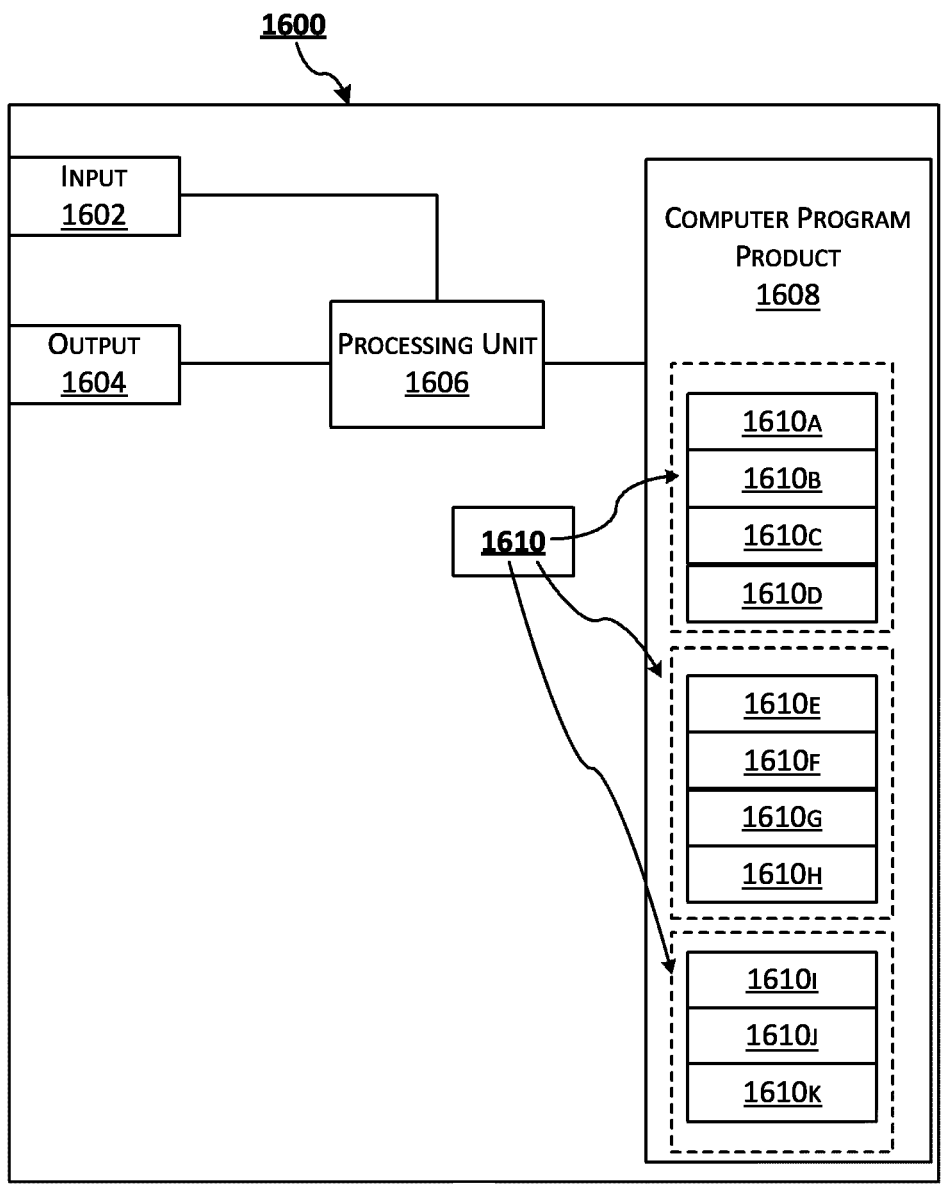

METHODS USED IN NETWORK NODE, AND RECEIVING AND TRANSMITTING NODES OF LINK, AND ASSOCIATED DEVICES

TECHNICAL FIELD

The technology presented in this disclosure generally relates to the technical field of wireless communication networks. More particularly, the present disclosure relates to a method used in a network node and the associated network node, to a method used in a receiving node of a link and the associated receiving node, and to a method used in a transmitting node of a link and the associated transmitting node.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Currently, wireless communication networks or systems, such as MilliMeter-Wave (MMW) wireless systems, operating at high frequencies from 30-300 GHz, are emerging as a promising technology to meet exploding bandwidth requirements by enabling multi-Gb/s speeds. For example, the 5th Generation (5G) network is likely to be a combination of evolved 3rd Generation (3G) technologies, the 4th Generation (4G) technologies and emerging or substantially new components such as Ultra-Density Network (UDN), which is also referred to as MMW Radio Access Technology (RAT). At such high frequencies, a large number of antennas can be available at a transmitter, a receiver, or both. In order to make up for the large propagation loss that typically occurs, beam-forming becomes a very important feature in MMW wireless systems.

Beam-forming is a signal processing technique used for directional signal transmission or reception. This is achieved by combining antenna elements in a phased array in such a way that signals at particular angles experience constructive interference while others experience destructive interference. Beam-forming can be used at both the transmitting and receiving ends in order to achieve spatial selectivity. The improvement compared with omnidirectional reception/transmission is known as a beam-forming gain. When multiple antennas are available at transmitters, receivers or both, it is therefore important to apply efficient beam patterns to the antennas to better exploit the spatial selectivity of the corresponding wireless channel.

FIG. 1 schematically shows one example MMW RAT network. As shown in FIG. 1, there is a network node called as Central Control Unit (CCU), which is responsible for parameter configurations and coordination among Access Nodes (ANs), e.g., AN1, AN2, AN3, and AN4.

Typically, received power in a receiver side can be expressed as:

$$P_{rx} = P_{TX} \cdot G_{TX} \cdot G_{RX} \left(\frac{r}{4\pi\lambda}\right)^2 \cdot e^{-\alpha r}$$

where $P_{TX}$ is transmitted power, $G_{TX}$ and $G_{RX}$ are gains of transmitting and receiving antennas, respectively, $\lambda$ is the wavelength, and $\alpha$ is the attenuation factor due to absorption in the medium. For an MMW-wave link at 60 GHz, oxygen absorption loss can be as high as 16 dB/km.

From the above formula, it is clear that the attenuation of radio wave is proportional to $1/\lambda^2$. With the same propagation distance, 60 GHz attenuates 29.5 dB more compared to 2 GHz, without considering the oxygen absorption.

In considering this, high gain beam-forming is mandatory in order to compensate the extra attenuation. Thanks to the small wavelength, more antenna elements can be integrated in the antenna panel with the same size. This makes it possible to reach a higher beam-forming gain. However, if there are several tens or several hundreds of antenna elements, one RF chain for each antenna element is inapplicable due to unacceptable cost. In such a case, multiple antenna elements share one RF chain and analog phase adjustment is applied for each antenna in order to adjust the beam direction and maximize the beam-forming gain. Due to the narrow TX beam, it is needed to steer transmission of beacon signals to enable AN discovery area, and to preform beam-forming training to maximize the beam-forming gain.

Meanwhile, high gain beam-forming could bring challenges, including, e.g., hidden problem and deafness problem.

FIG. 2 illustrates an example of the hidden problem caused by directivity of high gain beam-forming. As shown in FIG. 2, link pair 1 is composed by Access Point 1 (AP1) and User Equipment 1 (UE1), and link pair 2 is composed by AP2 and UE2. When AP2 is transmitting to UE2, neither AP 1 or UE 1 can detect the channel utilized by AP2 and UE2 because both AP1 and UE1 are outside of the TX beam coverage from AP2 to UE2. However, when AP1 transmits data to UE1, its TX beam can reach UE2 and cause interference.

FIG. 3 illustrates an example of the deafness problem caused by directivity of high gain beam-forming. As shown in FIG. 3, UE 1 and AP1 compose link pair 1 and UE2 and AP2 compose link pair 2. The second link pair has ongoing data transmission from AP2 to UE2. But this is not detected by UE1 because UE1 does not monitor this direction. When UE 1 starts the data transmission, the data receiving by UE2 can be clearly impacted due to UE1 and UE2 are close.

Currently, it is supposed that the total carrier bandwidth of the MMW-RAT can be up to 1 or 2 GHz. This bandwidth can be composed by a number of sub-band carriers of a certain bandwidth, e.g. 100 MHz. By way of example, FIG. 4 illustrates one MMW-RAT carrier with 4 sub-bands. The smallest resource grid in the figure corresponds to a sub-band in the frequency domain and to a subframe in the time domain.

To allocate the available resources, a contention based resource allocation scheme and/or a scheduling based resource allocation scheme may be applied in MMW-RAT as the basic policy of collision avoidance. A contention based resource allocation scheme provides a mechanism to compete for the channel based on the self-determination on the channel availability. In a scheduling based resource allocation scheme, a scheduler, e.g., a CCU as shown in FIG. 1, gains the resource controllability first via either contention based method or coordination method first and allocates the resource to controlled links.

There could be certain combination of the contention based resource allocation scheme and the scheduling based resource allocation scheme. FIG. 5 illustrates an example of a complex interference situation in a MMW-RAT network.

As shown in FIG. 5, due to directivity of high gain beam-forming, Link 1 and Link 2 may have unendurable UpLink (UL) to DownLink (DL) interference while Link 5 and Link 6 may have unendurable DL to DL interference and UL to DL interference.

Due to directivity of high gain beam-forming, the collision determination is more complex than omni-transmission. The traditional measurement does not work well due to the aforementioned deafness and hidden problems. Besides, though carrier sensing methods commercially used in Wireless Local Area Network (WLAN, 802.11) and Wireless Personal Area Network (WPAN, 802.15) are developed, they are mainly for local access system. It is a distributed carrier sensing scheme, i.e., the carrier sensing is done by each node pair independently. For MMW RAT, firstly it is expected that there can be better dimensioned deployment involving multiple nodes of APs and UEs, and better network controllability (e.g., self-optimization, self-organization, and mobility) than Wireless Fidelity (WiFi) is targeted. Secondly, MMW RAT is expected to provide much better Quality of Service (QoS) than WiFi. In this sense, a better measurement than simple distributed carrier sensing of WiFi is desired.

The interference measurements in 3G and 4G wireless systems are mainly designed to measure the inter-cell/inter-Transmission-Point interference rather than inter-link interference. Due to small sector size and the large overlapping coverage in case of MMW RAT, the similar measurement as 3G or 4G systems is not enough to identify links in collision and help the interference management.

SUMMARY

It is in view of the above considerations and others that the various embodiments of the present technology have been made. To be specific, aiming to at least some of the above defects, the present disclosure proposes to align directional sounding and sensing parameters for all links under control of a CCU, thereby facilitating interference measurements.

According to a first aspect of the present disclosure, there is proposed a method used in a network node. The method includes: determining sounding and sensing related parameters for a link, wherein the determined sounding and sensing related parameters include dedicated sounding and sensing related parameters for the link and common sounding and sensing related parameters for all links controlled by the network node, and wherein the common sounding and sensing related parameters include a sounding and sensing period and a sounding and sensing interval; and transmitting the determined sounding and sensing related parameters to a transmitting node and a receiving node of the link.

Preferably, the common sounding and sensing related parameters further include: a rule for the receiving node reporting its sensing result to the network node.

Preferably, the dedicated sounding and sensing related parameters for the link include a sounding resource parameter for specifying a resource unit for the transmitting node transmitting a sounding signal. The specified resource unit is in terms of at least one or more of: time, frequency, and code.

Preferably, the method further includes: receiving one or more sensing results from all receiving nodes of all links under control of the network node; determining a Directional Link Interference Map (DLIM) based on the received one or more sensing results; and determining a resource allocation scheme or a resource allocation strategy for data transmission in all links controlled by the network node based on the determined DLIM.

Preferably, the method is applied in MMW-RAT.

According to a second aspect of the present disclosure, there is proposed a method used in a receiving node of a link. The method includes: receiving sounding and sensing related parameters for the link from a network node, wherein the received sounding and sensing related parameters include dedicated sounding and sensing related parameters for the link and common sounding and sensing related parameters for all links controlled by the network node, and wherein the common sounding and sensing related parameters include a sounding and sensing period and a sounding and sensing interval; sensing all sounding signals in a direction of the link based on the received sounding and sensing related parameters; and reporting one or more sensing results to the network node.

According to a third aspect of the present disclosure, there is proposed a method used in a transmitting node of a link. The method includes: receiving sounding and sensing related parameters for the link from a network node, wherein the received sounding and sensing related parameters include dedicated sounding and sensing related parameters for the link and common sounding and sensing related parameters for all links controlled by the network node, and wherein the common sounding and sensing related parameters include a sounding and sensing period and a sounding and sensing interval; and transmitting a sounding signal in a direction of the link based on the sounding and sensing related parameters.

According to a fourth aspect of the present disclosure, there is proposed a network node. The network node includes: a determining unit configured to determine sounding and sensing related parameters for a link, wherein the determined sounding and sensing related parameters include dedicated sounding and sensing related parameters for the link and common sounding and sensing related parameters for all links controlled by the network node, and wherein the common sounding and sensing related parameters include a sounding and sensing period and a sounding and sensing interval; and a transmitting unit configured to transmit the determined sounding and sensing related parameters to a transmitting node and a receiving node of the link.

According to a fifth aspect of the present disclosure, there is proposed a receiving node of a link. The receiving node includes: a receiving unit configured to receive sounding and sensing related parameters for the link from a network node, wherein the received sounding and sensing related parameters include dedicated sounding and sensing related parameters for the link and common sounding and sensing related parameters for all links controlled by the network node, and wherein the common sounding and sensing related parameters include a sounding and sensing period and a sounding and sensing interval; a sensing unit configured to sense all sounding signals in a direction of the link based on the received sounding and sensing related parameters; and a reporting unit configured to report one or more sensing results to the network node.

According to a sixth aspect of the present disclosure, there is proposed a transmitting node of a link. The transmitting node includes: a receiving unit configured to receive sounding and sensing related parameters for the link from a network node, wherein the received sounding and sensing related parameters include dedicated sounding and sensing related parameters for the link and common sounding and sensing related parameters for all links controlled by the network node, and wherein the common sounding and sensing related parameters include a sounding and sensing period and a sounding and sensing interval; and a transmitting unit configured to transmit a sounding signal in a direction of the link based on the sounding and sensing related parameters.

According to a seventh aspect of the present disclosure, there is proposed a network node. The network node includes: a processor, and a memory including instructions which, when executed by said processor, cause said network node to: determine sounding and sensing related parameters for a link, wherein the determined sounding and sensing related parameters include dedicated sounding and sensing related parameters for the link and common sounding and sensing related parameters for all links controlled by the network node, and wherein the common sounding and sensing related parameters include a sounding and sensing period and a sounding and sensing interval; and transmit the determined sounding and sensing related parameters to a transmitting node and a receiving node of the link.

According to an eighth aspect of the present disclosure, there is proposed a computer program product storing instructions that when executed, cause one or more computing devices to perform the method of any of the first to the third aspects.

By aligning directional sounding and sensing parameters, e.g., in an MMW network, a transmitter of each link pair is configured with a time-frequency radio resource pattern to send directional sounding beam in its link direction, and correspondingly a receiver of each link pair is configured with the same time-frequency radio resource pattern to directionally monitor all possible sounding signals in its link directions. In this manner, receivers of all link pairs may be in a directional sensing state when their corresponding transmitters are sending directional sounding signals. This facilitates interference measurement within an aligned window, thereby improving interference measurement efficiency.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 15 is a schematic block diagram of a transmitting node 1500 for a link according to the present disclosure.

FIG. 16 schematically shows an embodiment of an arrangement 1600 which may be used in the network node 1300, the receiving node 1400, or the transmitting node 1500 according to the present disclosure.

DETAILED DESCRIPTION OF EMBODIMENTS

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

The present disclosure proposes to align directional sounding and sensing parameters, e.g., in an MMW network. To be specific, the present disclosure configures a transmitter of each link pair with a time-frequency radio resource pattern to send directional sounding beam in its link direction, and correspondingly configures a receiver of each link pair with the same time-frequency radio resource pattern to directionally monitor all possible sounding signals in its link directions. Thereby, receivers of all link pairs may be in a directional sensing state when their corresponding transmitters are sending directional sounding signals. In this way, the victim link pairs and the interfering link pairs can be accurately identified and the mutual interference levels can be measured. That is, an effective inter-link interference map (also referred to as DLIM) of an MMW RAT network can be derived. Such measurement information can be used to enhance the resource allocation schemes, e.g., time, frequency and transmit power resource.

Figure 6:
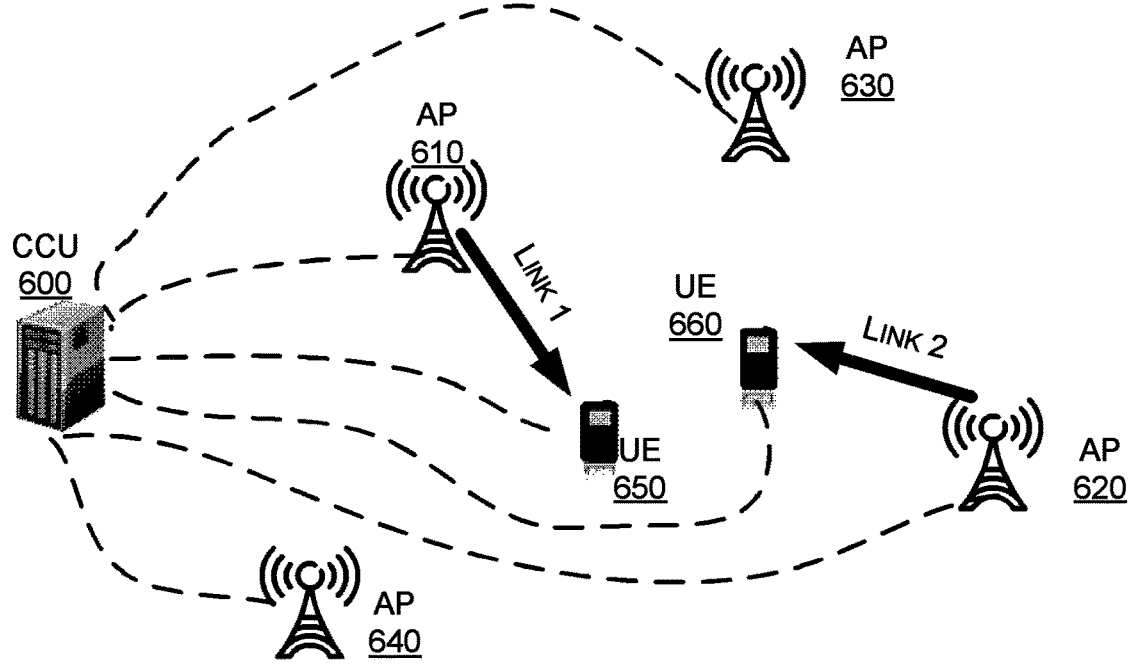
FIG. 6 depicts an example of a wireless communication network in which embodiments herein may be implemented.

FIG. 6 depicts an example of a wireless communication network in which embodiments herein may be implemented. The wireless communication network comprises a Central Control Unit (CCU) 600 and a plurality of network access nodes (ANs) whereof six ANs are depicted in FIG. 6. The CCU 600 may be a Node B, a Base Station (BS), an eNB, an eNodeB, an Home Node B, an Home eNode B, an AP or any other network node responsible for parameter configurations and coordination among ANs as well as controlling radio links among ANs, in any wireless system or cellular network, such as an LTE network, any 3rd Generation Partnership Project (3GPP) cellular network, an MWV network, a Wimax network, a WLAN/Wi-Fi, a WPAN etc. Each AN may e.g., be a wireless device, a mobile wireless terminal or a wireless terminal, a mobile phone, a computer such as a laptop, a Personal Digital Assistants (PDAs) or a tablet computer, sometimes referred to as a phablet, with wireless capability (the foregoing ones may be collectively known as a UE), a sensor or actuator with wireless capabilities or any other radio network units capable to communicate over a radio link in a wireless communication network. It should be noted that the term AN used in this document also covers other wireless devices such as Machine to Machine (M2M) devices, also denoted Machine Type Communication (MTC) devices. In this example, four ANs are exemplified as APs, i.e., AP 610, AP 620, AP 630, and AP 640, and two ANs are exemplified as UEs, i.e., UE 650 and UE 660. Furthermore, each AN can be regarded as either a transmitting node or a receiving node in different radio links. For example, in a link on which AP 610 transmits data to UE 650, AP 610 is a transmitting node, and UE 650 is a receiving node. In contrast, in a link on which AP 610 receives data from UE 650, AP 610 is a receiving node, and UE 650 is a transmitting node.

Figure 7:
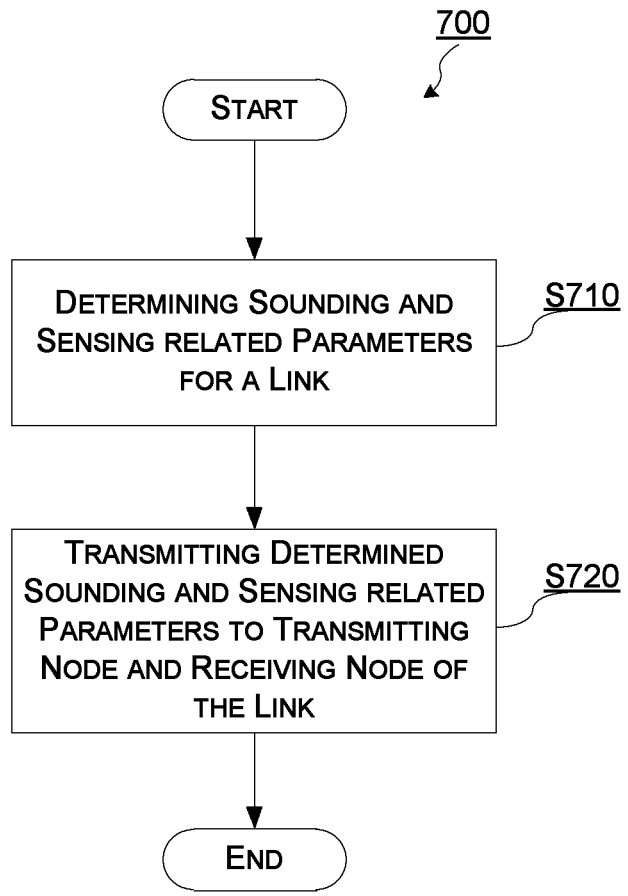
FIG. 7 shows a flowchart of a method 700 performed in a network node according to embodiments of the present disclosure.

FIG. 7 shows a flowchart of a method 700 performed in a network node, e.g., CCU 600 in FIG. 6, according to embodiments of the present disclosure.

At step S710, the network node determines sounding and sensing related parameters for a link, e.g., a radio link between AP 610 and UE 650 as shown in FIG. 6. The determined sounding and sensing related parameters include dedicated sounding and sensing related parameters for the link and common sounding and sensing related parameters for all links controlled by the network node. The common sounding and sensing related parameters include a sounding and sensing period and a sounding and sensing interval.

As a feasible implementation, the network node may determine the sounding and sensing related parameters upon receipt of a setup request for the link from, e.g., either end of the link, e.g., AP 610 or UE 650, etc.

At step S720, the network node transmits the determined sounding and sensing related parameters to a transmitting node and a receiving node of the link. For example, the transmitting node is AP 610 and the receiving node is UE 650, as shown in FIG. 6.

In an implementation, the common sounding and sensing related parameters may further include: a rule for the receiving node reporting its sensing result to the network node.

In another implementation, the dedicated sounding and sensing related parameters for the link may include a sounding resource parameter for specifying a resource unit for the transmitting node transmitting a sounding signal. The specified resource unit is in terms of at least one or more of: time, frequency, and code.

In another implementation, the method 700 may further include the following steps (not shown) of: receiving one or more sensing results from all receiving nodes of all links under control of the network node; determining a DLIM based on the received one or more sensing results; and determining a resource allocation scheme or a resource allocation strategy for data transmission in all links controlled by the network node based on the determined DLIM.

One major advantage with the method 700 is receiving nodes of all link pairs may be in a directional sensing state when their corresponding transmitting nodes are sending directional sounding signals. This can efficiently improve spatial reuse of frequency resources while avoiding and/or controlling collisions among different links.

Figure 8:
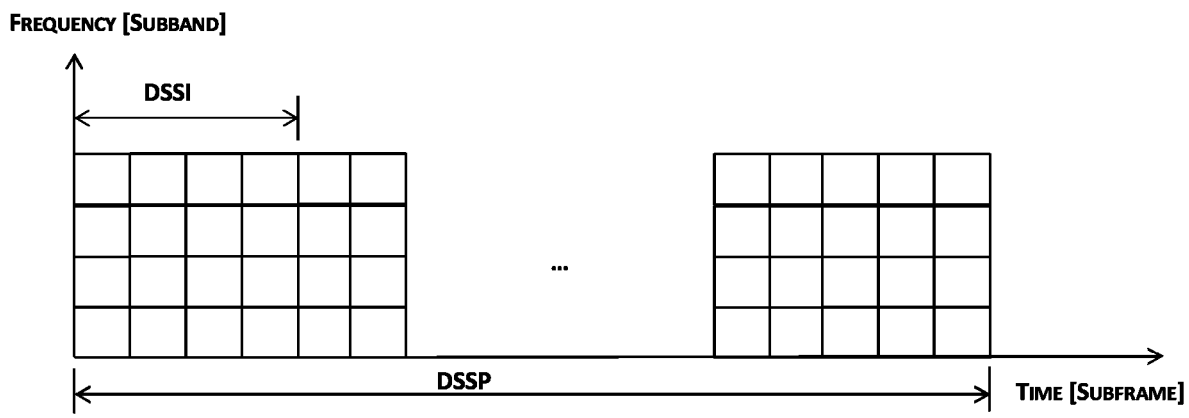
FIG. 8 illustrates a general sounding and sensing resource allocation structure according to embodiments of the present disclosure.

FIG. 8 illustrates a general sounding and sensing resource allocation structure according to embodiments of the present disclosure.

As shown in FIG. 8, Directional Sounding and Sensing Period (DSSP) denotes a sounding and sensing period, and Directional Sounding and Sensing Interval (DSSI) denotes a sounding and sensing interval, i.e., a window for sounding and sensing. The DSSP and DSSI are common sounding and sensing related parameters for all links controlled by the network node, and may be determined by the network node.

Figure 1:
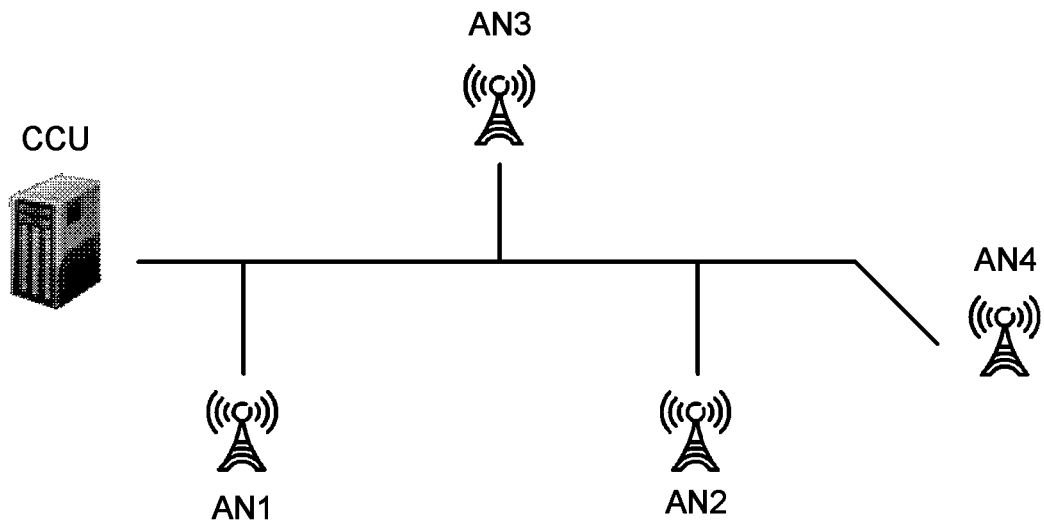
FIG. 1 schematically shows one example MMW RAT network.
Figure 2:
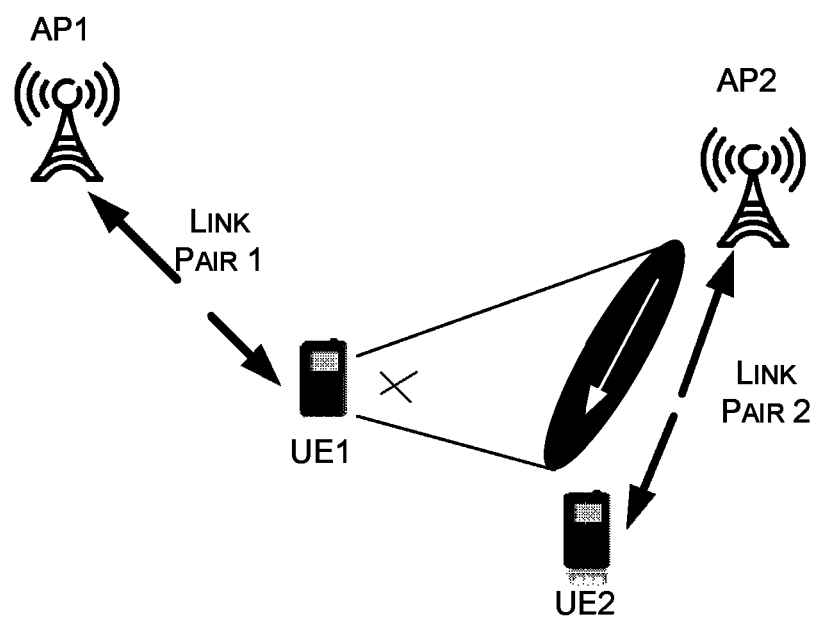
FIG. 2 illustrates an example of the hidden problem caused by directivity of high gain beam-forming.
Figure 3:
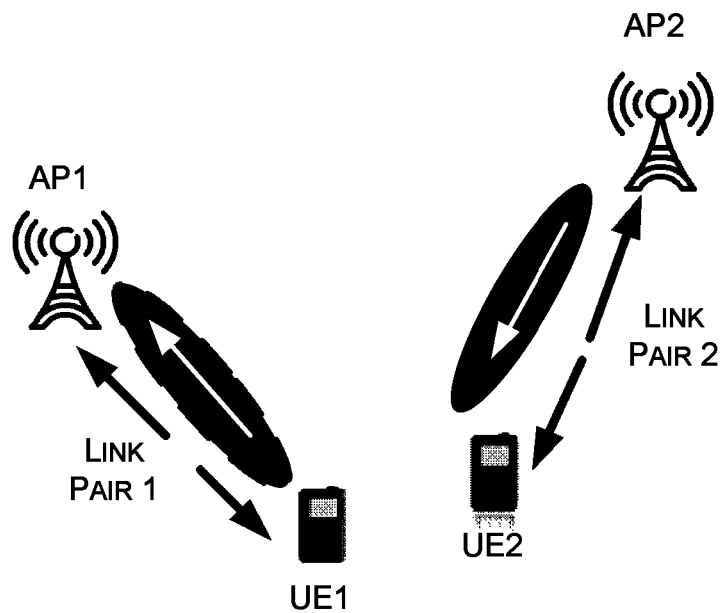
FIG. 3 illustrates an example of the deafness problem caused by directivity of high gain beam-forming.
Figure 4:
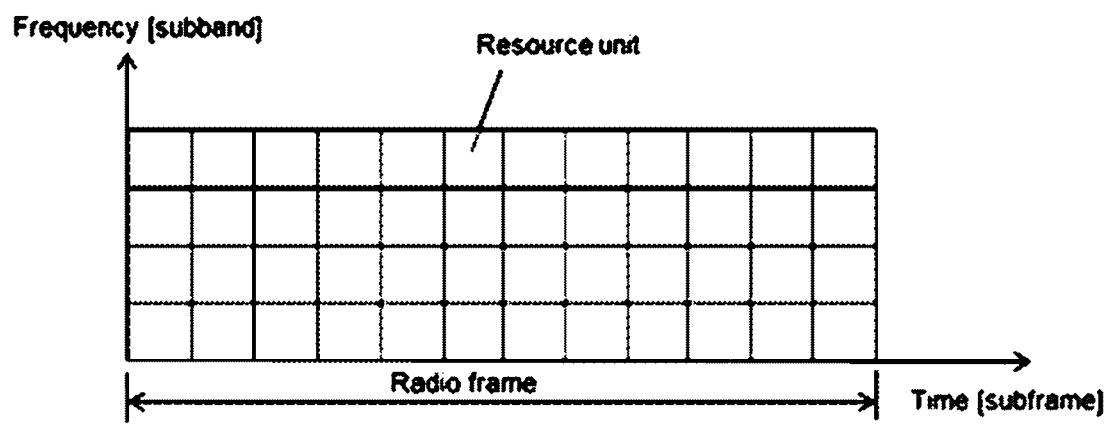
FIG. 4 illustrates one MMW-RAT carrier with 4 sub-bands.
Figure 5:
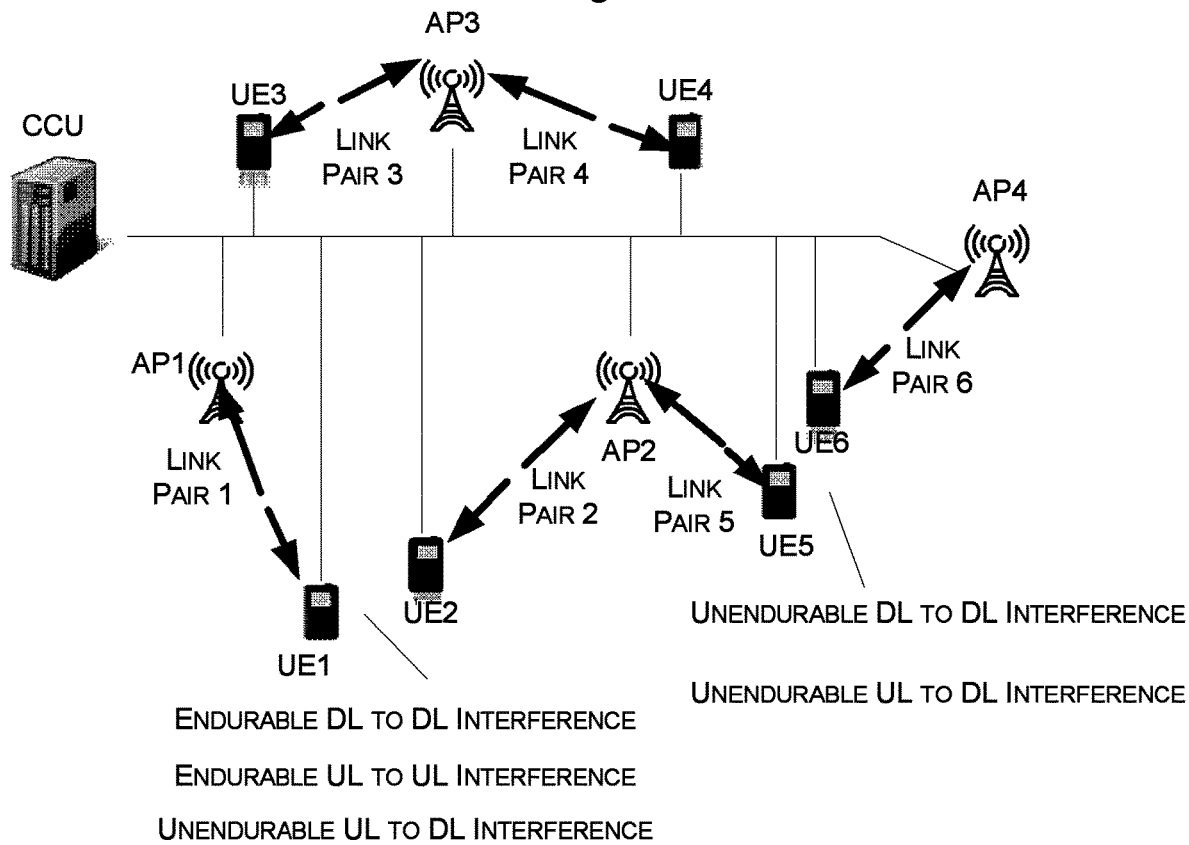
FIG. 5 illustrates an example of a complex interference situation in a MMW-RAT network.

The DSSP and DSSI are mainly in terms of time domain. For example, the DSSP and DSSI both refer to time windows. In this case, a transmitting node of each link may transmit a sounding signal to a receiving node of the link in a direction of the link during a time window defined by the DSSI, and the receiving node senses all sounding signals in a direct of the link during the same time window. Thereby, inter-link interferences, e.g., DL-DL interference between link 5 and link 6 as shown in FIG. 5, can be sensed in an efficient manner.

Optionally, the DSSP and DSSI may be further in terms of frequency domain. For example, the DSSI may further define one or more sub-bands to be used by the transmitting node/the receiving node of the link.

Within the DSSI, there is a number of Sounding Resource Units (SRUs), which are also allocated to a link by means of dedicated sounding and sensing related parameters. One SRU may be defined in terms of at least one or more of: time, frequency, and code. For example, one SRU may be defined as one time-frequency resource unit plus an orthogonal sequence. This means that multiple sounding signals may be multiplexed over one time-frequency unit by using orthogonal sequences.

In practice, the DSSI may be determined based on the link density in the network and the DSSP may be short enough to track the TX/RX beam change of link pairs, including both TX/RX direction change and TX power change.

An exemplary DLIM may be described by referring to FIG. 5. As shown in FIG. 5, the DLIM can indicate the received sounding signal power from the transmitter of each link (Link i, e.g., any one of links 1-6 as shown in FIG. 5) and the received sounding signal strengths from other links whose sounding signals are detected by the link (Link i) receiver.

The DLIM may identify whether a transmitter of a first link contributes considerable interference to a receiver of a second link. If there is considerable interference contributed, the interference level and the corresponding link identity are included in the DLIM. Relying the sounding signals (SRU) and corresponding signal strengths reported from a receiver, the network node can identify the links and corresponding interference levels to the receiver.

For example, the DLIM may be updated upon receipt of a new directional sounding report from a receiver, or upon link setup/link release.

With such DLIM, the present disclosure can enhance the radio resource allocation (e.g. time, frequency and TX power resource), so that the spatial reuse can be efficiently and sufficiently improved.

Figure 9:
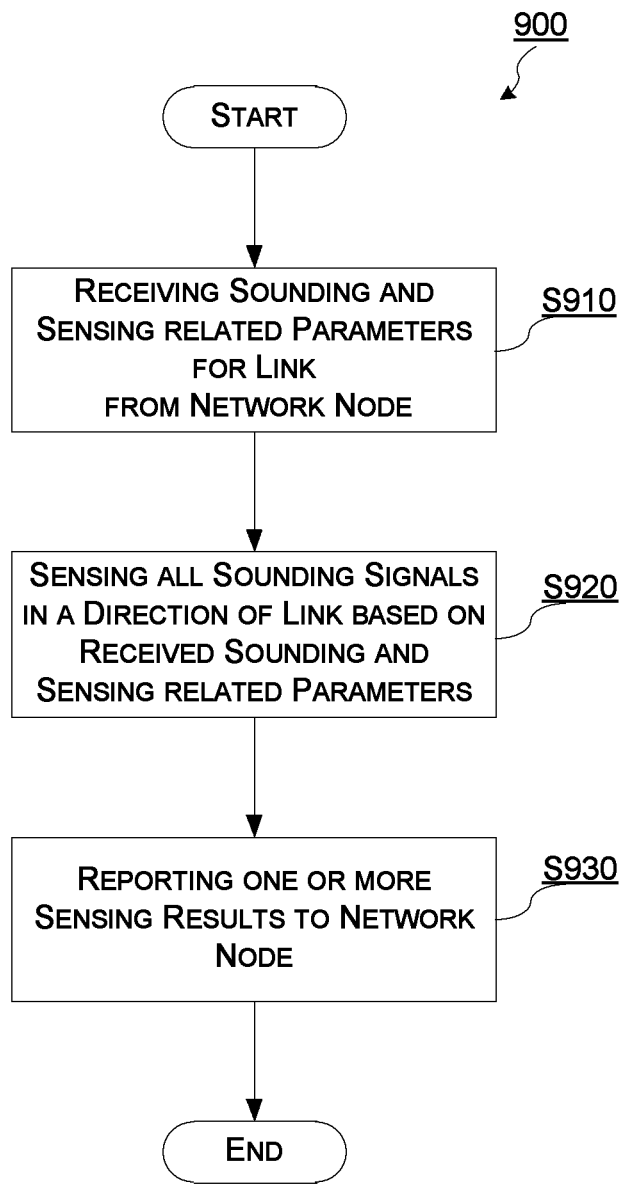
FIG. 9 shows a flowchart of a method 900 performed in a receiving node of a link according to embodiments of the present disclosure.

FIG. 9 shows a flowchart of a method 900 performed in a receiving node of a link, such as a radio link between AP 610 and UE 650 as shown in FIG. 6, according to embodiments of the present disclosure. In this case, the receiving node may be AP 610 or UE 650. For illustration, UE 650 is taken as the receiving node here, and correspondingly AP 610 serves as a corresponding transmitting node for the receiving node, and vice versa.

At step S910, UE 650 receives sounding and sensing related parameters for the link from a network node, e.g., the CCU 600 in FIG. 6. The received sounding and sensing related parameters include dedicated sounding and sensing related parameters for the link and common sounding and sensing related parameters for all links controlled by the network node. The common sounding and sensing related parameters include a sounding and sensing period and a sounding and sensing interval.

At step S920, UE 650 senses all sounding signals in a direction of the link based on the received sounding and sensing related parameters.

At step S930, UE 650 reports one or more sensing results to the network node.

In an implementation, the common sounding and sensing related parameters further include: a rule for UE 650 reporting the one or more sensing results to the network node.

During the sounding interval, all receiving nodes shall be in blindly monitoring state in its link direction. Each receiving node shall target its RX beam in an incoming direction of its link. In order to leave some room for the RX beam adjustment during one sounding period, the RX beam for directional sensing could be wider than the RX beam for actual data receiving.

Via blind detection, the receiving node may determine information on SRU of the detected sounding signals. This information shall be reported to the network node for possible interfering transmitter identification. Moreover, the receiving node may further measure the strength of each detected sounding signal. This measurement result shall be reported to the CCU to derive the DLIM, which can be used to determine the maximum allowed TX power for a transmitter or interference coordination pattern in order to control the interference.

Figure 10:
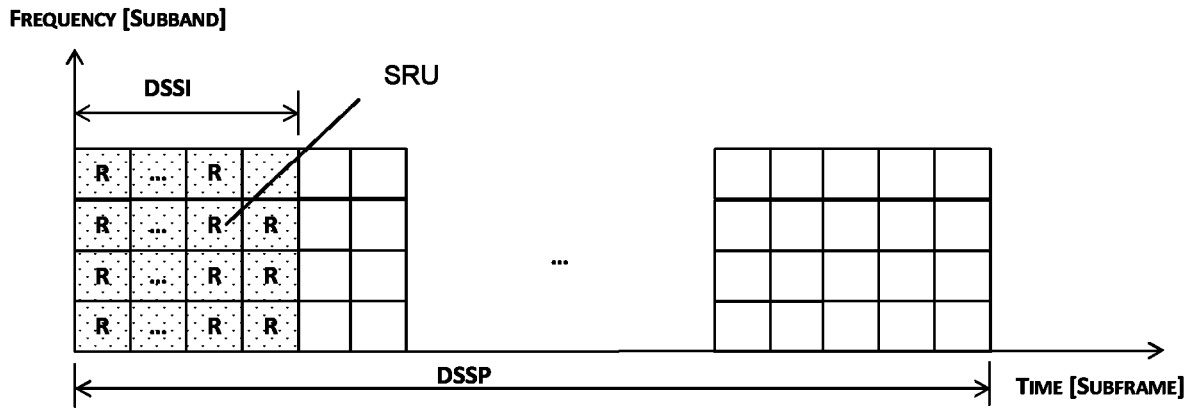
FIG. 10 illustrates an example sensing source allocation structure according to embodiments of the present disclosure.

FIG. 10 illustrates an example sensing source allocation structure according to embodiments of the present disclosure. As shown in FIG. 10, each receiving node may sense all possible sounding signals in its link direction over all SRUs during the DSSI.

One major advantage with the method 900 is that the receiving node can sense all sounding signals in a direction of the link in a time window during which its corresponding transmitting node is transmitting sounding signals. When the method 900 is applied in two neighboring links, interference between these two links can be sensed in an efficient manner.

Figure 11:
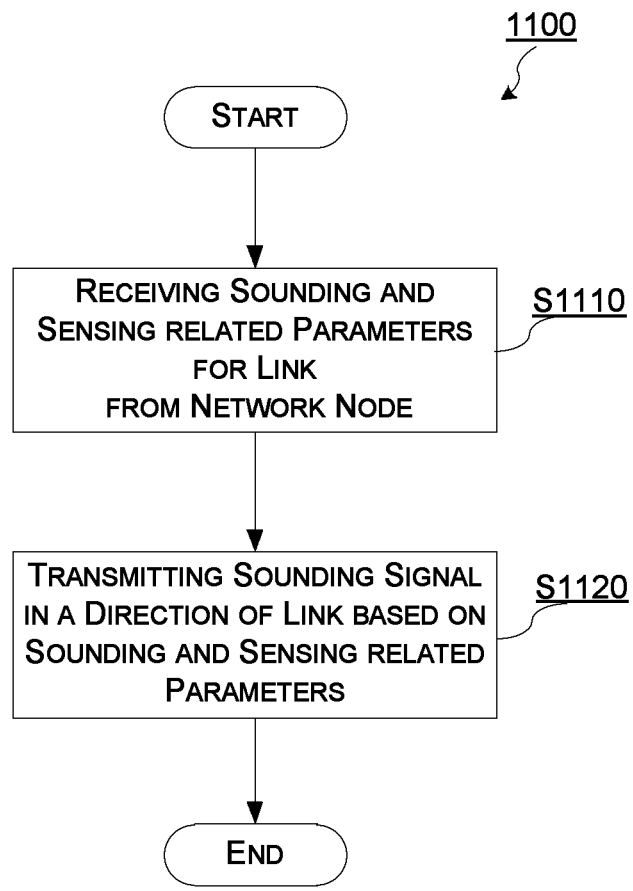
FIG. 11 shows a flowchart of a method 1100 performed in a transmitting node of a link according to embodiments of the present disclosure.

FIG. 11 shows a flowchart of a method 1100 performed in a transmitting node of a link, such as a radio link between AP 610 and UE 650 as shown in FIG. 6, according to embodiments of the present disclosure. In this case, the transmitting node may be AP 610 or UE 650. For illustration, AP 610 is taken as the transmitting node here, and correspondingly UE 650 serves as a corresponding receiving node for the transmitting node, and vice versa.

At step S1110, AP 610 receives sounding and sensing related parameters for the link from a network node, e.g., the CCU 600 as shown in FIG. 6. The received sounding and sensing related parameters include dedicated sounding and sensing related parameters for the link and common sounding and sensing related parameters for all links controlled by the network node. The common sounding and sensing related parameters include a sounding and sensing period and a sounding and sensing interval, e.g., DSSP and DSSI as shown in FIG. 8.

At step S1120, AP 610 transmits a sounding signal in a direction of the link based on the sounding and sensing related parameters.

In an implementation, the dedicated sounding and sensing related parameters for the link include a sounding resource parameter for specifying a resource unit for the transmitting node transmitting the sounding signal. The specified resource unit is in terms of at least one or more of: time, frequency and code.

Figure 12:
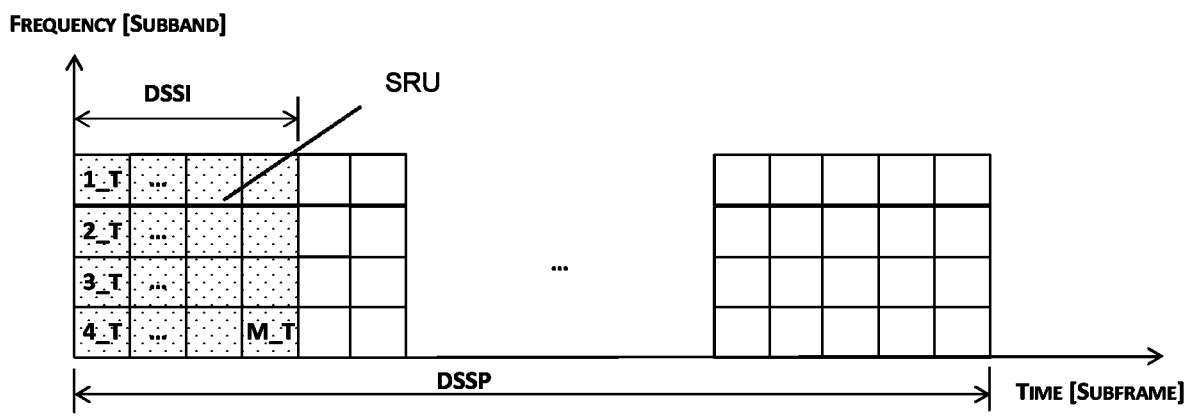
FIG. 12 illustrates an example sounding source allocation structure according to embodiments of the present disclosure.

FIG. 12 illustrates an example sounding source allocation structure according to embodiments of the present disclosure.

As shown in FIG. 12, each transmitting node may be allocated in one SRU, and there are totally M transmitters controlled by the network node, e.g., the CCU 600 as shown in FIG. 6. Optionally, each SRU may be also defined in terms of frequency. For example, each SRU may occupy one sub-band.

One major advantage with the method 1100 is that the transmitting node can transmit a sounding signal in a direction of the link in a time window during which its corresponding receiving node is sensing the sounding signal. When the method 1100 is applied in two neighboring links, interference between these two links can be sensed in an efficient manner.

Figure 13:
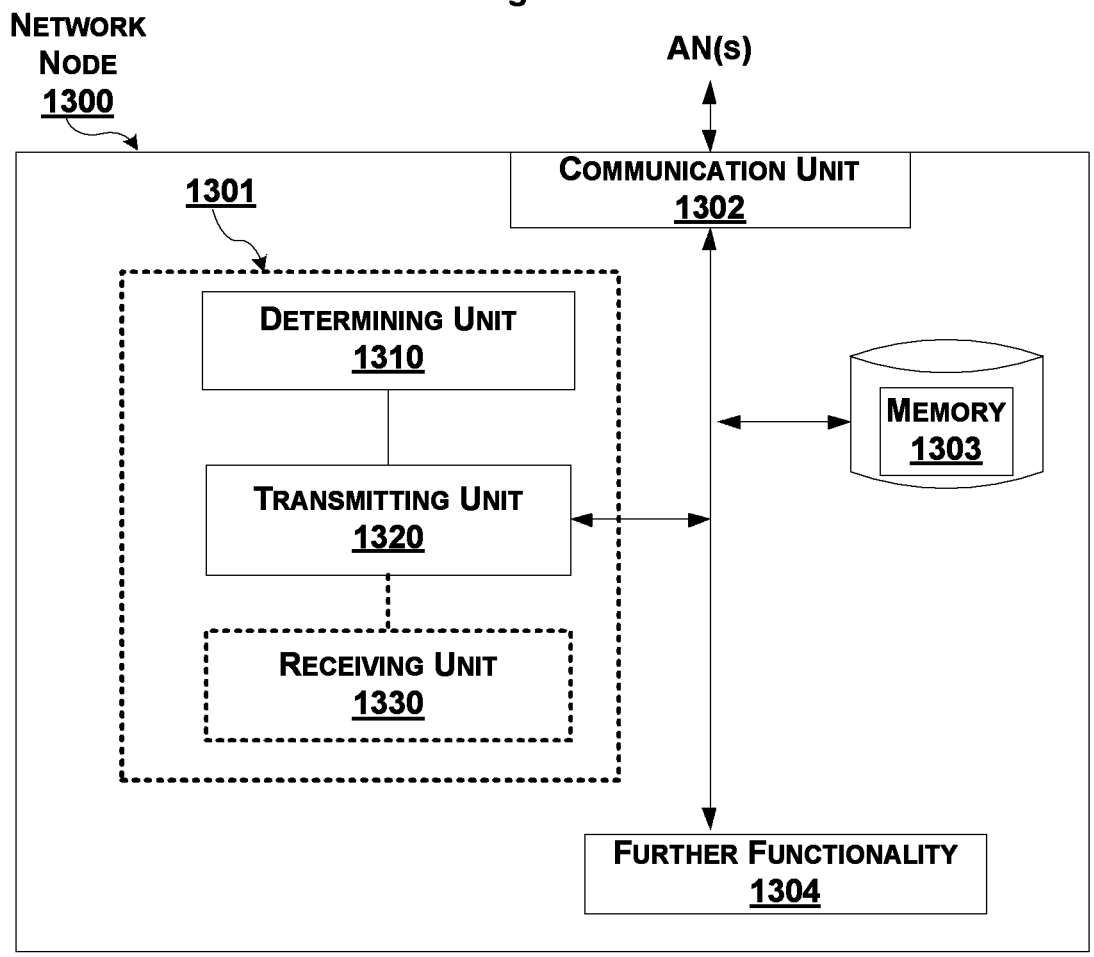
FIG. 13 is a schematic block diagram of a network node 1300 according to the present disclosure.

FIG. 13 is a schematic block diagram of a network node 1300 according to the present disclosure.

The part of network node 1300 which is most affected by the adaptation to the herein described method, e.g., the method 700, is illustrated as an arrangement 1301, surrounded by a dashed line. The network node 1300 could be e.g. CCU 600 as shown in FIG. 6. Of course, the network node 1300 is not limited thereto, but may be other appropriate entities, which are responsible for parameter configurations and coordination among ANs as well as controlling radio links among ANs in any wireless system or cellular network. The network node 1300 and arrangement 1301 may be further configured to communicate with other entities (e.g., ANs under the control of the network node 1300, such as AP 610 or UE 650 in FIG. 6, etc.) via a communication unit 1302 which may be regarded as part of the arrangement 1301. The communication unit 1302 comprises means for wireless communication, and may comprise means for, e.g., wired communication. The arrangement 1301 or the network node 1300 may further comprise other functional units 1304, such as functional units providing regular BS functions when the network node 1300 is a BS, and may further comprise one or more storage units (memories) 1303.

The arrangement 1301 may be implemented, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 7. The arrangement part of the network node 1300 may be implemented and/or described as follows.

Referring to FIG. 13, the network node 1300 includes a determining unit 1310 and a transmitting unit 1320.

The determining unit 1310 is configured to determine sounding and sensing related parameters for a link, e.g., a radio link between AP 610 and UE 650 as shown in FIG. 6. The determined sounding and sensing related parameters include dedicated sounding and sensing related parameters for the link and common sounding and sensing related parameters for all links controlled by the network node 1300. The common sounding and sensing related parameters include a sounding and sensing period (e.g., DSSP as shown in FIG. 8) and a sounding and sensing interval (e.g., DSSI as shown in FIG. 8).

In an implementation, the determining unit 1310 may determine the sounding and sensing related parameters upon receipt of a setup request for the link from, e.g., either end of the link, e.g., AP 610 or UE 650, etc.

The transmitting unit 1320 is configured to transmit the determined sounding and sensing related parameters to a transmitting node and a receiving node of the link. For example, the transmitting node is AP 610 and the receiving node is UE 650 as shown in FIG. 6.

In an implementation, the common sounding and sensing related parameters may further include: a rule for the receiving node reporting its sensing result to the network node 1300.

In another implementation, the dedicated sounding and sensing related parameters for the link may include a sounding resource parameter for specifying a resource unit for the transmitting node transmitting a sounding signal. For example, the specified resource unit may be SRU as shown in FIG. 10 or FIG. 12.

Optionally, the network node 1300 may further include a receiving unit 1330. The receiving unit 1330 is configured to receive one or more sensing results from all receiving nodes of all links under control of the network node 1300. In this case, the determining unit 1310 is further configured to determine a DLIM, e.g., as shown in FIG. 5, based on the received one or more sensing results and to determine a resource allocation scheme or a resource allocation strategy for data transmission in all links controlled by the network node based on the determined DLIM.

It should be noted that two or more different units in this disclosure may be logically or physically combined. For example, the transmitting unit 1320 and the receiving unit 1330 may be combined as one single unit.

Figure 14:
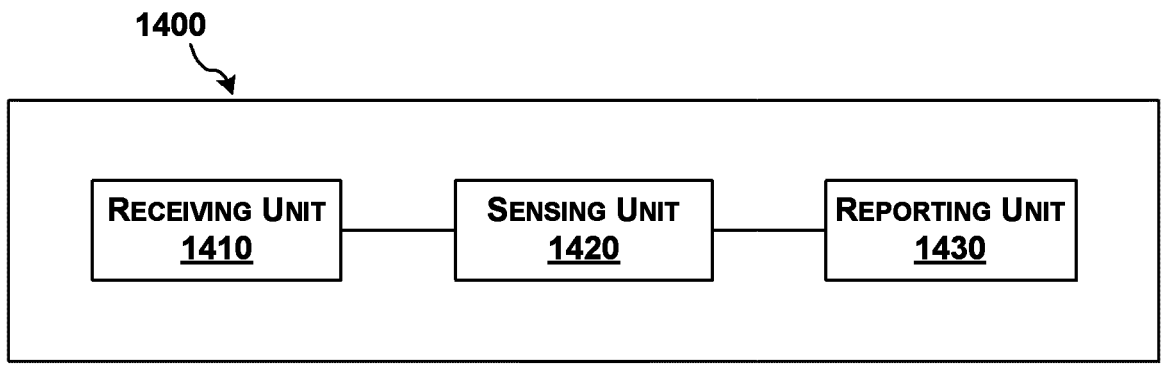
FIG. 14 is a schematic block diagram of a receiving node 1400 for a link according to the present disclosure.

FIG. 14 is a schematic block diagram of a receiving node 1400 for a link, e.g., a radio link between AP 610 and UE 650 as shown in FIG. 6, according to the present disclosure. For example, the receiving node may be AP 610 or UE 650 as shown in FIG. 6.

As shown in FIG. 14, the receiving node 1400 includes a receiving unit 1410, a sensing unit 1420, and a reporting unit 1430.

The receiving unit 1410 is configured to receive sounding and sensing related parameters for the link from a network node. The received sounding and sensing related parameters include dedicated sounding and sensing related parameters for the link and common sounding and sensing related parameters for all links controlled by the network node. The common sounding and sensing related parameters include a sounding and sensing period (e.g., DSSP as shown in FIG. 8) and a sounding and sensing interval (e.g., DSSI as shown in FIG. 8).

In an implementation, the common sounding and sensing related parameters further include: a rule for the receiving node reporting the one or more sensing results to the network node.

The sensing unit 1420 is configured to sense all sounding signals in a direction of the link based on the received sounding and sensing related parameters.

The reporting unit 1430 is configured to report one or more sensing results to the network node. For example, the reporting unit 1430 may use the rule received from the network node to report one or more sensing results to the network node. The network node then may use the sensing results to determine a DLIM as shown in FIG. 5.

FIG. 15 is a schematic block diagram of a transmitting node 1500 for a link, e.g., a radio link between AP 610 and UE 650 as shown in FIG. 6, according to the present disclosure. For example, the transmitting node may be AP 610 or UE 650 as shown in FIG. 6.

As shown in FIG. 15, the transmitting node 1500 includes a receiving unit 1510 and a transmitting unit 1520.

The receiving unit 1510 is configured to receive sounding and sensing related parameters for the link from a network node. The received sounding and sensing related parameters include dedicated sounding and sensing related parameters for the link and common sounding and sensing related parameters for all links controlled by the network node. The common sounding and sensing related parameters include a sounding and sensing period (e.g., DSSP as shown in FIG. 8) and a sounding and sensing interval (e.g., DSSI as shown in FIG. 8).

The transmitting node 1520 is configured to transmit a sounding signal in a direction of the link based on the sounding and sensing related parameters.

In an implementation, the dedicated sounding and sensing related parameters for the link include a sounding resource parameter for specifying a resource unit for the transmitting node transmitting the sounding signal. The specified resource unit is in terms of at least one or more of: time, frequency and code. An example of the specified resource unit is a SRU as shown in FIG. 12.

It should be noted that the receiving node 1400 and the transmitting node 1500 may refer to the same AN as shown in FIG. 6. For example, in a link on which AP 610 transmits data to UE 650, AP 610 is a transmitting node, and UE 650 is a receiving node. In contrast, in a link on which AP 610 receives data from UE 650, AP 610 is a receiving node, and UE 650 is a transmitting node.

FIG. 16 schematically shows an embodiment of an arrangement 1600 which may be used in the network node 1300, the receiving node 1400, or the transmitting node 1500 according to the present disclosure.

Comprised in the arrangement 1600 are here a processing unit 1606, e.g., with a Digital Signal Processor (DSP). The processing unit 1606 may be a single unit or a plurality of units to perform different actions of procedures described herein. The arrangement 1600 may also comprise an input unit 1602 for receiving signals from other entities, and an output unit 1604 for providing signal(s) to other entities. The input unit and the output unit may be arranged as an integrated entity or as illustrated in the example of FIG. 13, FIG. 14 or FIG. 15.

Furthermore, the arrangement 1600 may comprise at least one computer program product 1608 in the form of a non-volatile or volatile memory, e.g., an Electrically Erasable Programmable Read-Only Memory (EEPROM), a flash memory and a hard drive. The computer program product 1608 comprises a computer program 1610, which comprises code/computer readable instructions, which when executed by the processing unit 1606 in the arrangement 1600 causes the arrangement 1600 and/or the network node, the receiving node or the transmitting node in which it is comprised to perform the actions, e.g., of the procedure described earlier in conjunction with FIG. 7, FIG. 9 or FIG. 11.

The computer program 1610 may be configured as a computer program code structured in computer program modules 1610A-1610D, 1610E-1610H, or 1610I-1610K.

Hence, in an exemplifying embodiment when the arrangement 1600 is used in the network node 1300 (e.g., the arrangement 1600 may embody the arrangement 1301), the code in the computer program of the arrangement 1600 includes a determining module 1610A, for determining sounding and sensing related parameters for a link. The determined sounding and sensing related parameters include dedicated sounding and sensing related parameters for the link and common sounding and sensing related parameters for all links controlled by the network node. The common sounding and sensing related parameters include a sounding and sensing period and a sounding and sensing interval. The code in the computer program 1610 further includes a transmitting module 1610B, for transmitting the determined sounding and sensing related parameters to a transmitting node and a receiving node of the link. Optionally, the code in the computer program 1610 further includes a receiving module 1610C, for receiving one or more sensing results from all receiving nodes of all links under control of the network node. The code in the computer program 1610 may comprise further modules, illustrated as module 1610D, e.g. for controlling and performing other related procedures associated with the network node's operations. For example, when the network node is a BS, then the module 1610D may control and perform other related procedures associated with the BS's operations.

In another exemplifying embodiment when the arrangement 1600 is used in the receiving node 1400, the code in the computer program of the arrangement 1600 includes a receiving module 1610E, for receiving sounding and sensing related parameters for the link from a network node. The received sounding and sensing related parameters include dedicated sounding and sensing related parameters for the link and common sounding and sensing related parameters for all links controlled by the network node. The common sounding and sensing related parameters include a sounding and sensing period and a sounding and sensing interval. The code in the computer program further includes a sensing module 1610F, for sensing all sounding signals in a direction of the link based on the received sounding and sensing related parameters. The code in the computer program further includes a reporting unit 1610G, for reporting one or more sensing results to the network node. The code in the computer program 1610 may comprise further modules, illustrated as module 1610H, e.g. for controlling and performing other related procedures associated with the receiving node's operations. For example, when the receiving node is a UE, then the module 1610H may control and perform other related procedures associated with the UE's operations.

In another exemplifying embodiment when the arrangement 1600 is used in the transmitting node 1500, the code in the computer program of the arrangement 1600 includes a receiving module 1610I, for receiving sounding and sensing related parameters for the link from a network node. The received sounding and sensing related parameters include dedicated sounding and sensing related parameters for the link and common sounding and sensing related parameters for all links controlled by the network node. The common sounding and sensing related parameters include a sounding and sensing period and a sounding and sensing interval. The code in the computer program further includes a transmitting module 1610J, for transmitting a sounding signal in a direction of the link based on the sounding and sensing related parameters. The code in the computer program 1610 may comprise further modules, illustrated as module 1610K, e.g. for controlling and performing other related procedures associated with the transmitting node's operations. For example, when the transmitting node is a UE, then the module 1610K may control and perform other related procedures associated with the UE's operations.

The computer program modules could essentially perform the actions of the flow illustrated in FIG. 7, to emulate the network node 1300, or the actions of the flow illustrated in FIG. 9, to emulate the receiving node 1400, or the actions of the flow illustrated in FIG. 11, to emulate the transmitting node 1500. In other words, when the different computer program modules are executed in the processing unit 1606, they may correspond, e.g., to the units 1310-1330 of FIG. 13, or to the units 1410-1430 of FIG. 14, or to the units 1510-1520 of FIG. 15.

Although the code means in the embodiments disclosed above in conjunction with FIG. 16 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method used in a network node, the method comprising:
   determining sounding and sensing related parameters for a link, wherein the determined sounding and sensing related parameters include dedicated sounding and sensing related parameters for the link and common sounding and sensing related parameters for all links controlled by the network node, and wherein the common sounding and sensing related parameters include a sounding and sensing period and a sounding and sensing interval;
   transmitting the determined sounding and sensing related parameters to a transmitting node and a receiving node of the link; and
      determining a resource allocation scheme or a resource allocation strategy for data transmission in all links controlled by the network node based on a Directional Link Interference Map (DLIM) based on receiving one or more sensing results from all receiving nodes of all links under control of the network node.

2. The method of claim 1, wherein the common sounding and sensing related parameters further include: a rule for the receiving node reporting its sensing result to the network node.

3. The method of claim 1, wherein the dedicated sounding and sensing related parameters for the link comprise a sounding resource parameter for specifying a resource unit for the transmitting node transmitting a sounding signal, the specified resource unit being in terms of at least one or more of: time, frequency, and code.

4. The method of claim 1, wherein the method is applied in a MilliMeter Waves (MMW) Radio Access Technology (RAT).

5. A method used in a receiving node of a link, the method comprising:
  receiving sounding and sensing related parameters for the link from a network node, wherein the received sounding and sensing related parameters include dedicated sounding and sensing related parameters for the link and common sounding and sensing related parameters for all links controlled by the network node, and wherein the common sounding and sensing related parameters include a sounding and sensing period and a sounding and sensing interval;
  sensing all sounding signals in a direction of the link based on the received sounding and sensing related parameters; and
reporting one or more sensing results to the network node, wherein the network node determines a resource allocation scheme or a resource allocation strategy for data transmission in all links controlled by the network node based on a Directional Link Interference Map (DLIM) from all receiving nodes of all links under control of the network node.

6. The method of claim 5, wherein the common sounding and sensing related parameters further include: a rule for the receiving node reporting the one or more sensing results to the network node.

7. The method of claim 5, wherein the method is applied in a MilliMeter Waves (MMW) Radio Access Technology (RAT).

8. A method used in a transmitting node of a link, the method comprising:
  receiving sounding and sensing related parameters for the link from a network node, wherein the received sounding and sensing related parameters include dedicated sounding and sensing related parameters for the link and common sounding and
  sensing related parameters for all links controlled by the network node, and wherein the common sounding and sensing related parameters include a sounding and sensing period and a sounding and sensing interval;
  transmitting a sounding signal in a direction of the link based on the sounding and sensing related parameters; and
  receiving from a network node a resource allocation scheme or a resource allocation strategy for data transmission in all links controlled by the network node based on a Directional Link Interference Map (DLIM) based on receiving one or more sensing results from all receiving nodes of all links under control of the network node.

9. The method of claim 8, wherein the dedicated sounding and sensing related parameters for the link comprise a sounding resource parameter for specifying a resource unit for the transmitting node transmitting the sounding signal, the specified resource unit being in terms of at least one or more of: time, frequency and code.

10. The method of claim 8, wherein the method is applied in a MilliMeter Waves (MMW) Radio Access Technology (RAT).

11. A network node, the network node comprising:
  a processor;
  a memory operatively coupled to the processor and storing program instructions for execution by the processor whereby the network node is configured to:
    determine sounding and sensing related parameters for a link, wherein the determined sounding and sensing related parameters include dedicated sounding and sensing related parameters for the link and common sounding and sensing related parameters for all links controlled by the network node, and wherein the common sounding and sensing related parameters include a sounding and sensing period and a sounding and sensing interval;
    transmit the determined sounding and sensing related parameters to a transmitting node and a receiving node of the link; and
    determine a resource allocation scheme or a resource allocation strategy for data transmission in all links controlled by the network node based on a Directional Link Interference Map (DLIM) based on receiving one or more sensing results from all receiving nodes of all links under control of the network node.

12. The network node of claim 11, wherein the common sounding and sensing related parameters further include: a rule for the receiving node reporting its sensing result to the network node.

13. The network node of claim 11, wherein the dedicated sounding and sensing related parameters for the link comprise a sounding resource parameter for specifying a resource unit for the transmitting node transmitting a sounding signal, the specified resource unit being in terms of at least one or more of: time, frequency, and code.

14. The network node of claim 11, wherein the network node is applied in a MilliMeter Waves (MMW) Radio Access Technology (RAT).

15. A receiving node of a link, the receiving node is configured to:
  receive sounding and sensing related parameters for the link from a network node, wherein the received sounding and sensing related parameters include dedicated sounding and sensing related parameters for the link and common sounding and sensing related parameters for all links controlled by the network node, and wherein the common sounding and sensing related parameters include a sounding and sensing period and a sounding and sensing interval;
  sense all sounding signals in a direction of the link based on the received sounding and sensing related parameters; and
  report one or more sensing results to the network node, wherein the network node determines a resource allocation scheme or a resource allocation strategy for data transmission in all links controlled by the network node based on a Directional Link Interference Map (DLIM) based on receiving one or more sensing results from all receiving nodes of all links under control of the network node.

16. The receiving node of claim 15, wherein the common sounding and sensing related parameters further include: a rule for the receiving node reporting the one or more sensing results to the network node.

17. The receiving node of claim 15, wherein the receiving node is applied in a MilliMeter Waves (MMW) Radio Access Technology (RAT).

18. A transmitting node of a link, the transmitting node comprising:
  a receiver configured to receive sounding and sensing related parameters for the link from a network node, wherein the received sounding and sensing related parameters include dedicated sounding and sensing related parameters for the link and common sounding and sensing related parameters for all links controlled by the network node, and wherein the common sounding and sensing related parameters include a sounding and sensing period and a sounding and sensing interval and further configured to receive from a network node a resource allocation scheme or a resource allocation strategy for data transmission in all links controlled by the network node based on a Directional Link Interference Map (DLIM) based on receiving one or more sensing results from all receiving nodes of all links under control of the network node; and a transmitter configured to transmit a sounding signal in a direction of the link based on the sounding and sensing related parameters.

* * * * *